US006279398B1

(12) United States Patent
Bae et al.

(10) Patent No.: US 6,279,398 B1
(45) Date of Patent: Aug. 28, 2001

(54) METHOD FOR REALIZING TRANSMIT FOCUSING BY SYNTHESIZING PULSE PATTERNED PLANE WAVES HAVING SAME IMAGING POINT

(75) Inventors: Moo-Ho Bae, Seoul; Mok-Kun Jeong, Kyunggi-do, both of (KR)

(73) Assignee: Medison Co., Ltd., Kangwon-do (KR)

( * ) Notice: Subject to any disclaimer, the term of this patent is extended or adjusted under 35 U.S.C. 154(b) by 0 days.

(21) Appl. No.: 09/391,115

(22) Filed: Sep. 7, 1999

(30) Foreign Application Priority Data

Sep. 7, 1998 (KR) .................................................. 98-36791

(51) Int. Cl.$^7$ .............................. G01N 29/00; A61B 8/00
(52) U.S. Cl. ................................................ 73/625; 600/447
(58) Field of Search .............................. 73/625, 602, 645, 73/646, 647, 648, 597, 596; 600/437, 443, 444, 445, 447

(56) References Cited

U.S. PATENT DOCUMENTS

| 5,113,866 | * | 5/1992 | Hassler et al. .......................... 73/625 |
| 5,235,986 | * | 8/1993 | Maslak et al. .......................... 73/625 |
| 5,322,068 | * | 6/1994 | Thiele et al. ............................ 73/625 |
| 5,544,655 | * | 8/1996 | Daigle .................................... 73/625 |
| 5,798,461 | * | 8/1998 | Banta, Jr. et al. ...................... 73/625 |

\* cited by examiner

*Primary Examiner*—Helen Kwok
(74) *Attorney, Agent, or Firm*—F. Chau & Associates, LLP

(57) ABSTRACT

A method for realizing a transmit focusing in an ultrasonic imaging system is provided, which is a method for realizing a transmit focusing with respect to all imaging points by synthesizing pulse patterned plane waves having the same imaging point using transmit data and receive data with respect to plane waves of each pulse pattern having a different travelling direction and a linear time delay.

9 Claims, 3 Drawing Sheets

METHOD FOR REALIZING TRANSMIT FOCUSING BY SYNTHESIZING PULSE PATTERNED PLANE WAVES HAVING SAME IMAGING POINT

BACKGROUND OF THE INVENTION

1. Field of the Invention

The present invention relates to a method for realizing a transmit focusing in an ultrasonic imaging system, and more particularly, to a method for realizing a transmit focusing with respect to all imaging points by synthesizing pulse patterned plane waves having the same imaging point using transmit data and receive data with respect to plane waves of each pulse pattern having a different travelling direction and a linear time delay.

2. Description of the Related Art

A transmit focusing in an ultrasonic imaging system is accomplished by linearly overlapping plane waves having a different travelling direction in an imaging depth. A transmit sound field realizing the transmit focusing is accomplished from spacial expansion of plane waves passing through an imaging depth. Realizing a transmit focusing will be described with reference to the accompanying drawings.

FIG. 1 shows a continuous plane wave whose directional angle is $\theta$. In FIG. 1, a linear transducer is positioned on the x-axis around the origin on the x-z coordinate. A continuous plane wave $\Phi_\beta$ which is transmitted from each element of the linear transducer and proceeds at a directional angle $\theta$ with respect to the z-axis is expressed as the following equation (1).

$$\Phi_\beta = e^{-i\omega t} e^{ik\beta x} e^{ik\upsilon(z-z_f)} \quad (1)$$

Here, $\beta = \sin\theta$, $\upsilon^2 + \beta^2 = 1$, and $k = \omega_0/c\upsilon$. Also, $\omega$ is a frequency, t is the time when a continuous plane wave reaches any of imaging points (x, z), $\omega_0$ is a frequency at $\theta=0$, c is a velocity of the continuous plane wave, and $z_f$ is a focal point.

FIG. 2 shows overlapping continuous plane waves ($\Phi_0$, $\Phi_\beta$) whose frequencies are same and whose directional angles are 0 and $\theta$, respectively. In FIG. 2, the largest signal intensity appears at a focal point ($z=z_f$) where phases of the two continuous plane waves are overlapped. Also, as it is farther from the focal point toward the lateral direction, the phase difference of the two continuous plane waves becomes larger, and the signal intensity becomes small at the point to the receding lateral direction.

Thus, if all continuous plane waves which travel within the directional angle of the lateral direction from the focal point, that is, $\pm\theta_m$ (m is an integer) are overlapped, the overlapped wave is expressed as the following equation (2).

$$\Phi_\beta(x, z=z_f, t) = \int_{-\beta_m}^{+\beta_m} e^{-i\omega t} e^{ik\beta x} e^{ik\upsilon(z-z_f)} d\beta \quad (2)$$

$$= 2\beta_m \mathrm{sinc}\left(\frac{2\beta_m x}{\lambda}\right) \cdot e^{-i\omega t}$$

As shown in the equation (2), the overlapped wave with respect to the lateral direction continuous plane waves has the characteristics of the sinc function. That is, it can be seen that the transmit sound field due to overlapping the lateral direction continuous plane waves possesses the characteristics of the sinc function.

Also, as shown in FIG. 2, it can be seen that the phases of the two continuous plane waves are not consistent at an imaging depth beyond the focal point $z_f$ on the center axis having a main lobe. Thus, a signal intensity becomes small at the imaging depth beyond the focal point. Finally, the overlapped wave of the equation (2) has the diffractive characteristics according to the imaging depth. This is the reason why the transmit sound field according to the imaging depth is represented as a function of $\beta_m$.

Accordingly, if each frequency $\omega$ of continuous plane waves having a different travelling direction and a frequency $\omega_0$ at $\theta=0$ has the relationship of $\omega=\omega_0/\upsilon$, the phases of the continuous plane waves are consistent at all the imaging depths on the central axis having a main lobe. The phase consistent continuous plane waves on the central axis having the main lobe are shown in FIG. 3. The equation (2) is expressed again as the following equation (3).

$$\Phi_\beta(x, z, t) = e^{i\frac{\omega_0}{c}(z-z_f)} \int_{-\beta_m}^{+\beta_m} e^{-i\frac{\omega_0}{\upsilon}t} e^{i\frac{\omega_0}{c\upsilon}\beta x} d\beta \quad (3)$$

The equation (3) has a perfect non-diffraction characteristic in which the functions of x and z are separated. Also, the overlapped continuous plane wave of FIG. 3 should have a resolution of an imaging depth direction in order to be applied as a medical ultrasonic wave. In order to make the continuous plane wave have a resolution of the imaging depth direction, the pulse patterned plane waves having various frequencies should be overlapped. Thus, the equation (3) is frequency integrated and expressed as the following equation (4).

$$\Psi(x,z,t) = \int_{BW} F(\omega) \Phi_\beta(x,z,t) d\omega \quad (4)$$

Here, $\Psi(x, z, t)$ represents a frequency integrated overlapped wave, BW does a frequency band of a pulse, and $F(\omega)$ does a frequency characteristic function with respect to a pulse transmission and reception system.

A pulse patterned plane wave which is transmitted for each element of the linear transducer is obtained by substituting the equation (4) by z=0. However, since the pulse patterned plane wave obtained by substituting the equation (4) by z=0 has the infinite length on the temporal axis, a truncation error is induced. Also, the pulse pattern is complicated. Thus, in order to realize the pulse, complicated hardware is needed.

In addition, the lateral direction resolution of the pulse patterned plane wave relies on $\beta_m$. If $\beta_m$ is increased to enhance a resolution, a non-diffraction characteristic is weakened. Also, an overall signal intensity during transmit focusing with respect to all imaging points is smaller than that with respect to one point, a signal-to-noise ratio is lowered.

SUMMARY OF THE INVENTION

To solve the above problems, it is an object of the present invention to provide a method for realizing a transmit focusing with respect to all imaging points by applying a linear time delay to each pulse patterned plane wave having a different travelling direction without frequency-integrating the pulse patterned plane waves, and synthesizing pulse patterned plane waves having the same imaging point using transmit data and receive data with respect to plane waves of each pulse pattern having the linear time delay.

To accomplish the object according to one aspect of the present invention, there is provided a method for realizing a transmit focusing with respect to all imaging points by using plane waves of each pulse pattern having a different travelling direction which is transmitted from a transducer, the transmit focusing realization method comprising the steps of: (a) transmitting each pulse patterned plane wave having a linear time delay from a number of elements of the transducer; (b) storing transmit data and receive data with respect to each of the pulse patterned plane waves transmitted in step (a); (c) calculating the imaging points where each of the transmitted pulse patterned plane waves has reached, using the transmit data and the receive data stored in step (b); and (d) finding and linearly overlapping the transmitted pulse patterned plane waves having the same imaging point from the imaging points calculated in step (c).

BRIEF DESCRIPTION OF THE DRAWINGS

The object and other advantages of the present invention will become more apparent by describing in detail the structures and operations of the present invention with reference to the accompanying drawing, in which.

DETAILED DESCRIPTION OF THE PREFERRED EMBODIMENTS

A preferred embodiment of the present invention will be described with reference to the accompanying drawings.

Figure 1:
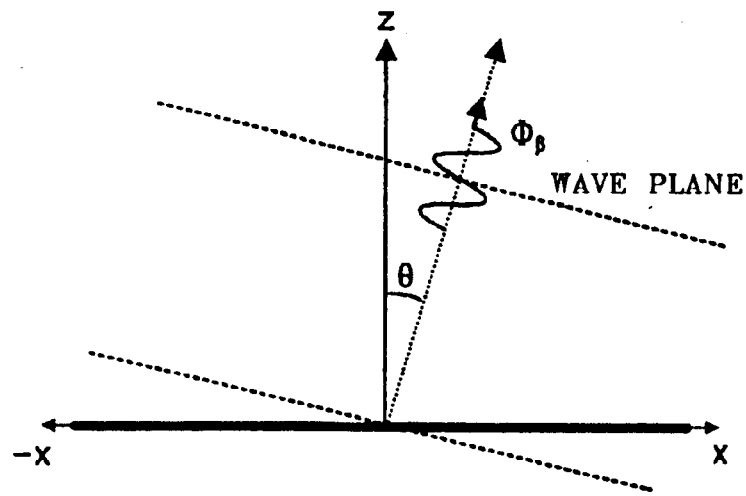
FIG. 1 shows a continuous plane wave of a linear transducer.
Figure 2:
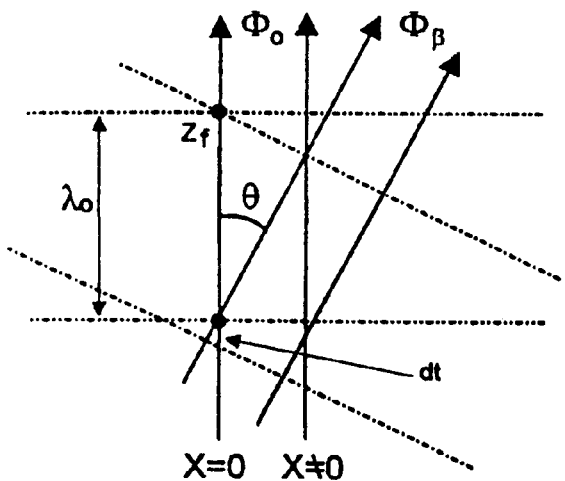
FIG. 2 shows overlapping of the continuous plane waves having the same frequency.
Figure 3:
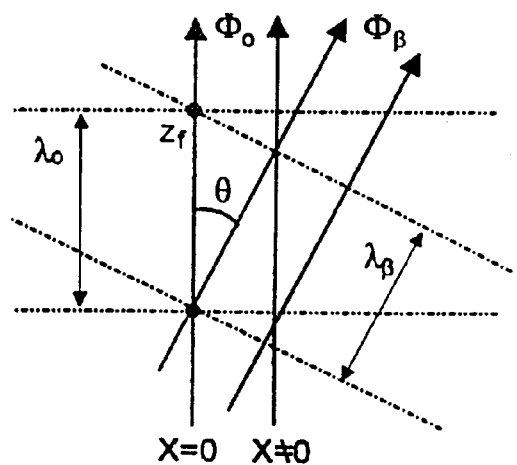
FIG. 3 shows overlapping of the continuous plane waves each having a different frequency.
Figure 4:
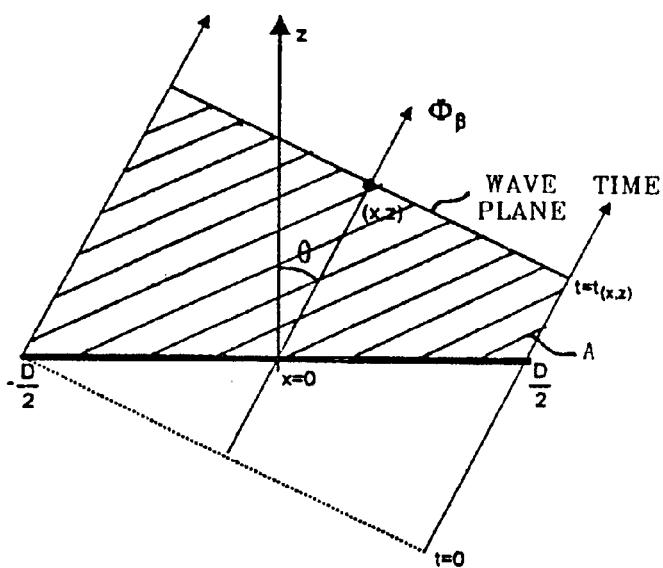
FIG. 4 shows a pulse patterned plane wave which travels at a directional angle θ and is applied with a linear time delay.

FIG. 4 shows a pulse patterned plane wave which travels at a directional angle θ and is applied with a linear time delay. In FIG. 4, a linear transducer having a magnitude D is positioned on the x-axis around the origin on the x-z coordinate. Linear time delays shown as dotted lines are applied to each element of the linear transducer. Then, the pulse patterned plane wave is transmitted from each transducer element. The pulse patterned plane wave $\Phi_\beta(x, z, t)_p$ having the linear time delay is expressed as the following equation (5).

$$\Phi_\beta(x,z,t)_p = \Phi_\beta(x,z,t) \cdot \exp(-i\omega^2 t^2/\sigma^2) \qquad (5)$$

Here, t is the time when the pulse patterned plane wave reaches any of imaging points (x, z), $\Phi_\beta(x, z, t)$ is a continuous plane wave, ω is a frequency, and σ is a Gaussian pulse width.

The imaging point (x, z) passed by the pulse patterned plane wave satisfies the following inequality (6).

$$0 \leq z \leq -\frac{|x|}{\tan\theta} + \frac{D}{2\tan\theta}, \; |x| \leq \frac{D}{2} \qquad (6)$$

Here, x is a point where each pulse patterned plane wave is transmitted, and z is an imaging depth where each of the transmitted pulse patterned plane wave reaches.

Also, a time $t_{(x, z)}$ when the transmitted pulse patterned plane wave reaches any of the imaging points (x, z) is expressed as the following equation (7).

$$t_{(x,z)} = \frac{z}{c}\upsilon + \frac{D}{2c}|\beta| - \frac{x}{c}|\beta| \qquad (7)$$

Here, c is the velocity of the pulse patterned plane wave (ultrasonic wave), and β=sin θ and υ=cos θ.

If the pulse patterned plane waves are transmitted as described above, only an image is obtained with respect to an area where each of the transmitted pulse patterned plane waves passes (an area "A" of FIG. 4).

The procedure of realizing a transmit focusing with respect to the pulse patterned plane waves will be described.

An unshown ultrasonic imaging system transmits a pulse patterned plane wave having a linear time delay from each transducer element. The ultrasonic imaging system stores transmit data with respect to each transmitted plane wave, that is, data with respect to a directional angle θ and data with respect to the transmit point x. In addition, the ultrasonic imaging system stores each receive signal and a reciprocating time 2t to any of the imaging depths, in which each of the transmitted pulse patterned plane waves reaches the any of the imaging depths z and then reflected and returned. The ultrasonic imaging system substitutes the equation (7) by the directional angle θ, the transmit point x, and the reciprocating time 2t which are stored with respect to each of the transmitted pulse patterned plane waves, and then obtains the imaging depth z where each of the transmitted pulse patterned plane waves reaches. In so doing, an imaging point (x, z) where each of the transmitted pulse patterned plane waves reaches is obtained.

The ultrasonic imaging system linearly overlaps the pulse patterned plane waves having the same imaging point (x, z). The above procedure is repeatedly performed with respect to all the imaging points. In so doing, a transmit focusing is realized with respect to the pulse patterned plane waves for all the imaging points.

If a dynamic receive focusing is performed using the stored reception signals with respect to each of the transmitted pulse patterned plane waves, transmit and receive focusing is accomplished with respect to all the imaging points.

Figure 5:
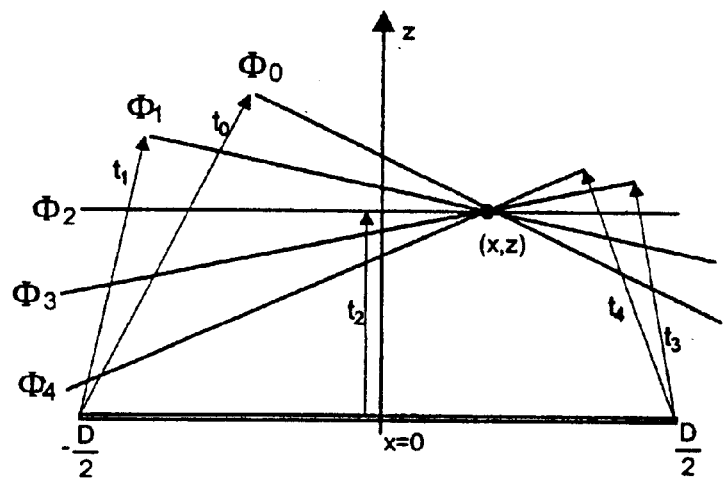
FIG. 5 shows an example of the transmit focusing which is realized by overlapping five pulse patterned plane waves.

FIG. 5 shows an example of the transmit focusing which is obtained by overlapping five pulse patterned plane waves. In FIG. 5, a plane waves $\Phi_n$ is transmitted and focused at an imaging point (x, z). A time taken when each pulse patterned plane wave reaches the imaging point is denoted as an arrow travelling time $t_n$.

Figure 6:
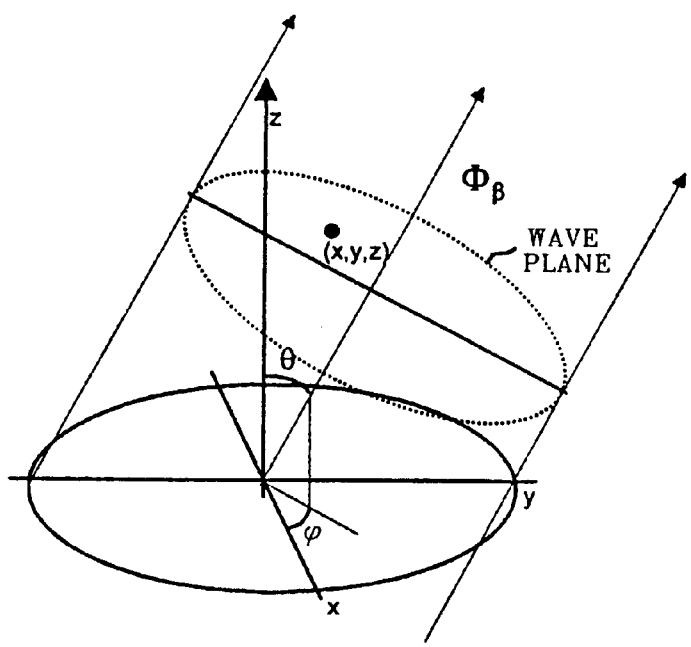
FIG. 6 shows a pulse patterned plane wave in a circular transducer.

FIG. 6 shows a pulse patterned plane wave in a circular transducer. As shown, the pulse patterned plane wave $\Phi_\beta$ travels with an angle θ with respect to the z-axis and an angle φ with respect to the x-axis. If the pulse patterned plane waves having the same imaging point (x, y, z) are synthesized using the transmit data (directional angles θ and φ and the transmit point) with respect to the pulse patterned plane waves having the different directional angles θ and φ, and the receive data (a reciprocating time with respect to any of the imaging points), it is possible to perform a transmit focusing with respect to the pulse patterned plane waves at all the imaging points. In addition, if a dynamic receive focusing is performed using each reception signal which reflected and returned from any of the points, it is possible to perform a transmit and receive focusing at all the imaging point. In this manner, a three-dimensional image is obtained.

As described above, the transmit focusing realization method according to the present invention synthesizes the pulse patterned plane waves having the same imaging point using transmit data and receive data with respect to the pulse patterned plane waves having a different travelling direction and a linear time delay, to realize a transmit focusing with respect to all the imaging points. Thus, the transmit focusing realization method according to the present invention is not limited by a value of β and any truncation error dose not occur. Also, the lateral direction resolution is not subject to receive limitation of the value of β.

What is claimed is:

1. A method for realizing a transmit focusing with respect to all imaging points by using plane waves of each pulse pattern having a different traveling direction which is transmitted from a transducer, the transmit focusing realization method comprising the steps of:

(a) transmitting each of the pulse patterned plane wave having a linear time delay from a number of elements of the transducer;

(b) storing transmit data and receive data with respect to each of the pulse patterned plane waves transmitted in step (a);

(c) calculating the imaging points where each of the transmitted pulse patterned plane waves has reached, using the transmit data and the receive data stored in step (b); and (d) finding and linearly overlapping the transmitted pulse patterned plane waves having the same imaging point from the imaging points calculated in step (c).

2. The transmit focusing realization method according to claim 1, wherein the pulse patterned plane wave having the linear time delay which is transmitted from a linear transducer positioned on the x-axis around the origin on the x-z coordinate is expressed by the following equation, $$\Phi_\beta(x,z,t)_P = \Phi_\beta(x,z,t) \cdot \exp(-i\omega^2 t^2/\sigma^2)$$

in which $\Phi_{\beta(x, z, t)P}$ is a pulse patterned plane wave having a linear time delay, t is the time when the pulse patterned plane wave reaches any of imaging points (x, z), $\Phi_\beta(x, z, t)$ is a continuous plane wave, ω is a frequency, and σ is a Gaussian pulse width.

3. The transmit focusing realization method according to claim 1, wherein said transmit data is a directional angle and a transmit point with respect to each of the transmitted pulse patterned plane waves.

4. The transmit focusing realization method according to claim 1, wherein said receive data is a time taken when each of the transmitted pulse patterned plane waves reciprocates from any of the imaging points and a signal reflected and returned from the point.

5. The transmit focusing realization method according to claim 1, wherein said step (c) obtains an imaging point (x, z) where each transmitted pulse patterned plane wave reaches by substituting the following equation by a transmit point (x) and an reciprocation time (2t) with respect to each of the pulse patterned plane waves, in the linear transducer positioned on the x-axis around the origin on the x-z coordinate, $$t(x, z) = \frac{z}{c}\upsilon + \frac{D}{2c}|\beta| - \frac{x}{c}|\beta|$$

in which c is the velocity of the pulse patterned plane wave (ultrasonic wave), D is a magnitude of the linear transducer and β=sin θ and υ=cos θ.

6. The transmit focusing realization method according to claim 5, wherein the transmit point (x) and an imaging depth (z) satisfy the following condition, $$0 \leq z \leq -\frac{|x|}{\tan\theta} + \frac{D}{2\tan\theta}, |x| \leq \frac{D}{2}.$$

7. The transmit focusing realization method according to claim 4, wherein a dynamic receive focusing with respect to all imaging points is performed using each signal which is reflected and returned from any of the imaging points.

8. A method for realizing a transmit focusing with respect to all imaging points by using plane waves of each pulse pattern having a different traveling direction which is transmitted from a transducer, the transmit focusing realization method comprising the steps of:

(a) transmitting each pulse patterned plane wave having a linear time delay from a linear transducer positioned on an x-axis around an origin on an x-z coordinate, expressed by the following equation, $$\Phi_\beta(x,z,t)_P = \Phi_\beta(x,z,t) \cdot \exp(-i\omega^2 t^2/\sigma^2)$$

in which $\Phi_{\beta(x,z,t)P}$ is a pulse patterned plane wave having a linear time delay, t is the time when the pulse patterned plane wave reaches any of imaging points (x,z), $\Phi_\beta(x,z,t)$ is a continuous plane wave, ω is a frequency, and σ is a Gaussian pulse width;

(b) storing transmit data and receive data with respect to each of the pulse patterned plane waves transmitted in step (a);

(c) calculating the imaging points where each of the transmitted pulse patterned plane waves has reached, using the transmit data and the receive data stored in step (b); and (d) finding and linearly overlapping the transmitted pulse patterned plane waves having the same imaging point from the imaging points calculated in step (c).

9. A method for realizing a transmit focusing with respect to all imaging points by using plane waves of each pulse pattern having a different traveling direction which is transmitted from a transducer, the transmit focusing realization method comprising the steps of:

(a) transmitting each pulse patterned plane wave having a linear time delay from a number of elements of the transducer;

(b) storing transmit data and receive data with respect to each pulse patterned plane wave transmitted in step (a);

(c) calculating an imaging point (x,z) where each transmitted pulse patterned plane wave has reached by substituting the following equation by the transmit point (x) and the reciprocation time 2t) with respect to each pulse patterned plane wave, in the linear transducer positioned on an x-axis around the origin on an x-z coordinate, $$t(x, z) = \frac{z}{c}\upsilon + \frac{D}{2c}|\beta| - \frac{x}{c}|\beta|$$

in which c is the velocity of the pulse patterned plane wave (ultrasonic wave), D is a magnitude of the linear transducer and β=sin θ and υ=cos θ, using the transmit data and the receive data stored in step (b); and (d) finding and linearly overlapping the transmitted pulse patterned plane waves having the same imaging point from the imaging points calculated in step (c).

* * * * *